(12) United States Patent
Kate et al.

(10) Patent No.: US 11,720,586 B2
(45) Date of Patent: Aug. 8, 2023

(54) AUTOMATIC CONVERSION OF DATA WITHIN DATA PIPELINE

(71) Applicant: International Business Machines Corporation, Armonk, NY (US)

(72) Inventors: Kiran A Kate, Chappaqua, NY (US); Martin Hirzel, Ossining, NY (US); Avraham Ever Shinnar, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 17/213,716

(22) Filed: Mar. 26, 2021

(65) Prior Publication Data

US 2022/0309073 A1    Sep. 29, 2022

(51) Int. Cl.
*G06F 16/25* (2019.01)
*G06N 5/04* (2023.01)
*G06N 20/00* (2019.01)
*G06F 17/18* (2006.01)

(52) U.S. Cl.
CPC ............. *G06F 16/258* (2019.01); *G06N 5/04* (2013.01); *G06N 20/00* (2019.01); *G06F 17/18* (2013.01)

(58) Field of Classification Search
CPC ......... G06F 16/258; G06F 17/18; G06N 5/04; G06N 20/00
See application file for complete search history.

(56) References Cited

U.S. PATENT DOCUMENTS

| 8,447,721 | B2 | 5/2013 | Eshleman |
| 10,706,066 | B2 | 7/2020 | Ganjam |
| 11,269,911 | B1 * | 3/2022 | Jones ...................... G06F 9/543 |
| 2019/0065569 | A1 | 2/2019 | Boutros |
| 2019/0220471 | A1 * | 7/2019 | Mota Toledo ......... G06N 7/005 |

(Continued)

FOREIGN PATENT DOCUMENTS

EP    3217335 A1    9/2017

OTHER PUBLICATIONS

"Scikit-learn: machine learning in Python", Github, Downloaded Jan. 4, 2021, 5 pages, <https://github.com/scikit-learn/scikit-learn>.

(Continued)

*Primary Examiner* — Mariela Reyes
*Assistant Examiner* — Courtney Harmon
(74) *Attorney, Agent, or Firm* — Peter Suchecki

(57) ABSTRACT

Embodiments of the present invention provide a computer system a computer program product, and a method that comprises analyzing identified data for a determined conversion of the identified data, wherein the identified data is input data stored on an external database; automatically converting the analyzed data to a uniform domain by mapping a data route within the analyzed data, predicting a plurality of outcomes based on an application of a plurality of scenarios associated with the mapped data route, ranking the predicted outcomes based on a positive match percentage for the analyzed data, and converting the analyzed data associated with at least one ranked outcome using a relational algebra algorithm; and dynamically transmitting the converted, analyzed data into at least one section of a machine learning data pipeline.

18 Claims, 4 Drawing Sheets

(56) References Cited

U.S. PATENT DOCUMENTS

| | | | |
|---|---|---|---|
| 2019/0354544 A1* | 11/2019 | Hertz | G06N 5/00 |
| 2020/0089722 A1 | 3/2020 | Horen | |
| 2020/0285694 A1 | 9/2020 | Nield | |
| 2020/0302296 A1 | 9/2020 | Miller | |
| 2021/0081609 A1* | 3/2021 | Johnson | G06F 40/242 |
| 2021/0390141 A1* | 12/2021 | Jacob | G06F 9/3877 |
| 2021/0397943 A1* | 12/2021 | Ribalta | G06V 10/764 |

OTHER PUBLICATIONS

"Sklearn2sql-demo", Github, Downloaded Jan. 4, 2021, 3 pages, <https://github.com/antoinecarme/sklearn2sql-demo>.
Ordonez, Carlos, "Data Set Preprocessing and Transformation in a Database System", 2011, DOI:10.3233/IDA-2011, 2 pages.
Petersohn et al., "Towards Scalable Dataframe Systems", arXiv:2001.00888v4 [cs.DB] Jun. 2, 2020, 19 pages.

* cited by examiner

AUTOMATIC CONVERSION OF DATA WITHIN DATA PIPELINE

BACKGROUND

The present invention relates generally to the field of data science technologies, and more specifically data conversion within data pipeline technology.

Data science is an inter-disciplinary field that uses scientific methods, processes, algorithms and systems to extract knowledge and insights from structural or unstructured data. Data science is related to data mining, machine learning and big data. The field encompasses analysis, preparing data for analysis, and presenting findings to inform high-level decisions in an organization. As such, data science corporates skills from computer science, mathematics, statistics, information visualization, graphic design, complex systems, communication and business.

Data pipeline is a set of data processing elements connected in series, where the output of one element is the input of the next one. The elements of a pipeline are often executed in parallel or in time-sliced fashion. Some amount of buffer storage is often inserted between elements. Computer-related pipelines include instruction pipelines, which are used in central processing units ("CPUs") and other microprocessors to allow overlapping execution of multiple instructions with the same circuitry. The circuitry is divided up into stages and each stage processes as a specific part of one instruction at a time, passing the partial result to the next stage. Computer-related pipelines also include software pipelines, which consist of a sequence of computing processes (i.e., commands, program runs, tasks, threads, procedures, etc.), conceptually executed in parallel, with the output stream of one process being automatically fed as the input stream of the next one. Computer-related pipelines also include graphics pipelines, which consist of multiple arithmetic units or complete CPUs, that implement the various stages of common rendering operations (i.e., perspective projection, window clipping, color and light calculation, rendering, etc.).

SUMMARY

Embodiments of the present invention provide a computer system a computer program product, and a method that comprises analyzing identified data for a determined conversion of the identified data, wherein the identified data is input data stored on an external database; automatically converting the analyzed data to a uniform domain by mapping a data route within the analyzed data, predicting a plurality of outcomes based on an application of a plurality of scenarios associated with the mapped data route, ranking the predicted outcomes based on a positive match percentage for the analyzed data, and converting the analyzed data associated with at least one ranked outcome using a relational algebra algorithm; and dynamically transmitting the converted, analyzed data into at least one section of a machine learning data pipeline.

DETAILED DESCRIPTION

Embodiments of the present invention recognize the need for a more efficient data pipeline by wrangling data associated with an external relational database within a machine learning data pipeline using relational algebra algorithms. Current practice in data science is to prepare a dataset with extensive data wrangling steps and then subsequently feed the wrangled dataset into a machine learning data pipeline. Generally, data wrangling is performed prior to cross-validations making the current technology vulnerable to possible data leakage during cross-validation within the machine learning data pipeline. Also, current data pipeline technologies leave decisions to differentiate between training data processes and score time data processes to a user, which increases a risk of user error. Embodiments of the present invention improve the data pipeline technology by increasing processing efficiency of a machine learning data pipeline via improving the computational performance associated with the wrangled data. Embodiments of the present invention increase the security of the machine learning data pipeline by converting the wrangled data prior to insertion within the machine learning data pipeline using relational algebra algorithms, which reduces a number of locations that sensitive data is processed outside of the data pipeline.

Figure 1:
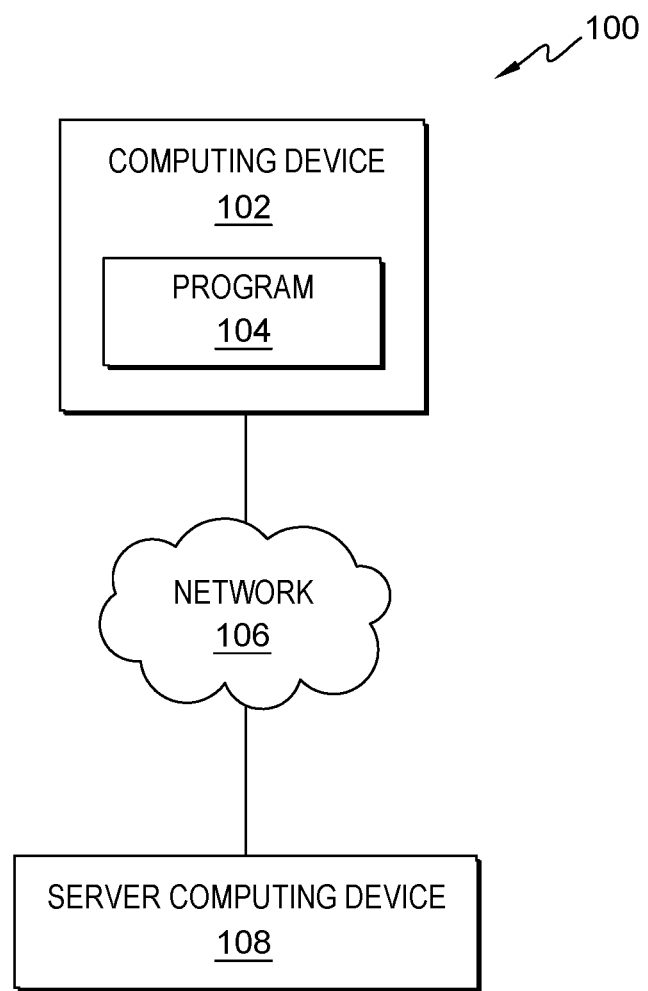
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computer 108. The computing device 102 and the server computer 108 may be desktop computers, laptop computers, specialized computer servers, smart phones, wearable technology, or any other computing devices known in the art. In certain embodiments, the computing device 102 and the server computer 108 may represent computing devices utilizing multiple computers or components to act as a single pool of seamless resources when accessed through a network 106. Generally, the computing device 102 and the server computer 108 may be representative of any electronic devices, or a combination of electronic devices, capable of executing machine-readable program instructions, as described in greater detail with regard to FIG. 4.

The computing device 102 may include a program 104. The program 104 may be a stand-alone program 104 on the computing device. In another embodiment, the program 104 may be stored on a server computer 108. In this embodiment, the program 104 improves the capabilities of data pipeline technology by automatically converting wrangled data via a plurality of transformation operators to an equivalent domain using relational algebra algorithms. In this embodiment, the program 104 uses the relational algebra algorithms to convert data into a procedural query language domain. In this embodiment, the program 104 coverts the wrangled data using the relational algebra algorithms to identify relations or commonalities within the data as input and yields instances of relations as the output, wherein the output is tabulated data that is tabulated based on the conversion into the relational domains. In this embodiment, the program 104 automatically converts wrangled data by mapping a plurality of transformers associated with the analyzed raw data; aggregating analyzed raw data based on a plurality of factors associated with preprocessing order; and reducing the aggregated data based on an application of a relation algebra algorithm. In this embodiment, the program 104 defines a transformer as an operator located within the computing device that receives instructions, performs actions, and transmits notification associated with the received instructions and performed actions to the program 104. In this embodiment, raw data is defined as data extracted from an original data source. In another embodiment, raw data may be defined as data found within a database. In this embodiment, the plurality of factors associated with the identified data is defined as data joins. In this embodiment, the program 104 defines a data join as a relational variable of data that allows for conversion into a single dataset as a dominator between the identified input and the pre-stored data set. For example, the program identifies type of data, projection of data, count of terms within data, and count of categories within data are each a data join.

In this embodiment, the program 104 maps the preprocessed raw data through a plurality of transformers based on an execution of data training and data prediction processes associated with the machine learning data pipeline. In this embodiment and in response to the execution of data training application on the preprocessed data, the program 104 reduces the aggregated data by removing data sets within the aggregated data based on an identified common factor within the plurality of factors associated with the trained data. In this embodiment and in response to dynamically prioritizing data, the program 104 inserts the dynamically prioritized data into the machine learning data pipeline. In another embodiment, the program 104 converts the analyzed raw data into standardized query language ("SQL") for uniformity, wherein each SQL is defined as the identified common factor, prior to the performing the dynamic prioritization of the preprocessed raw data.

In this embodiment and in response to inserting the dynamically prioritized data within the machine learning data pipeline, the program 104 dynamically selects at least one data point within the dynamically prioritized data based on data predictions using machine learning operator algorithms, wherein the program 104 determines a positive match of the plurality of factors associated with the data point within the dynamically prioritized data to the plurality of factors associated with the data prediction. For example, the program 104 prioritizes wrangled data based on a higher order that is converted to SQL prior to inserting the prioritized data into a machine learning data pipeline, wherein the program 104 predicts a conversion of the prioritized data using a relational algebra algorithm and dynamically selects at least a data point based on the prediction and the prioritized data.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 communicates with the computing device 102 via the network 106. In this embodiment, the server computer 108 stores the dynamically selected data points of the prioritized data of the program 104 (not shown). In another embodiment, the server computer 108 may include the program 104.

Figure 2:
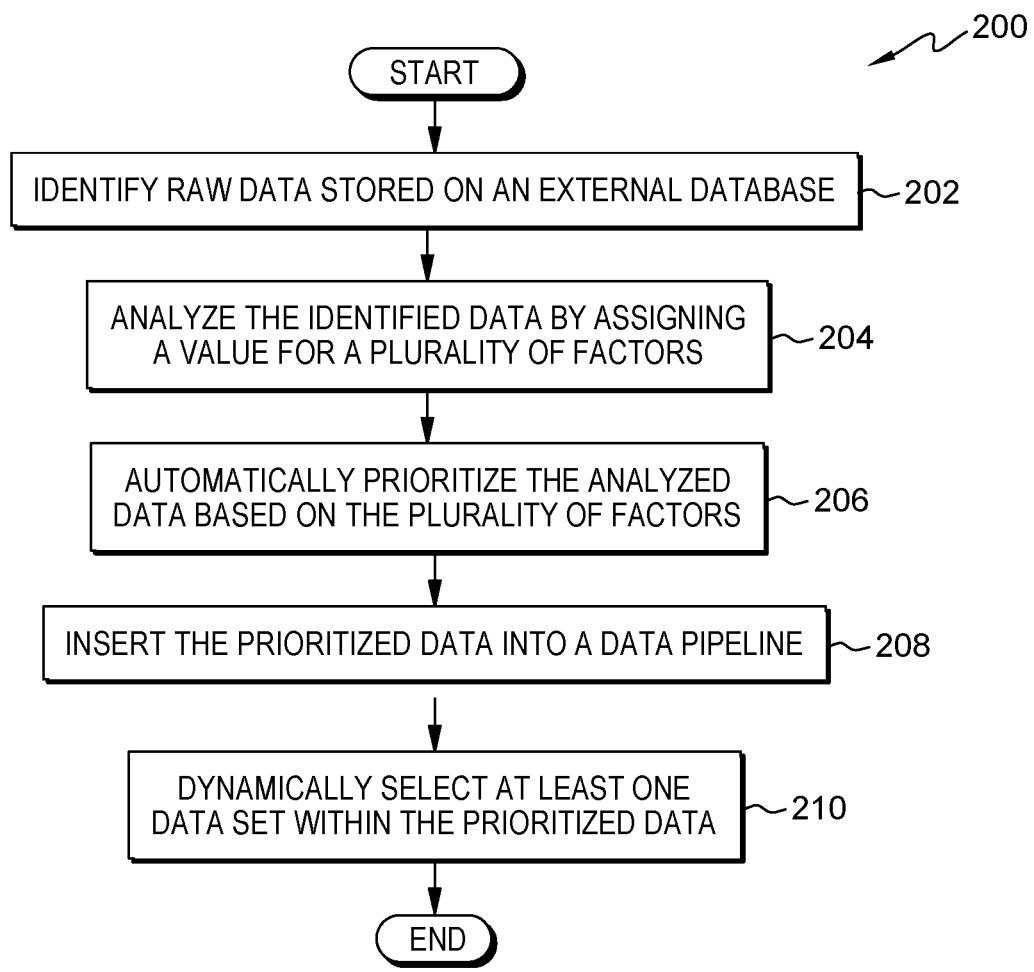
FIG. 2 is a flowchart illustrating operational steps for automatically converting data within a data pipeline, in accordance with at least one embodiment of the present invention.

FIG. 2 is a flowchart 200 illustrating operational steps for applying the automatic conversion to wrangled data within the machine learning data pipeline, in accordance with at least one embodiment of the present invention.

In step 202, the program 104 identifies raw data stored on an external database. In this embodiment, the program 104 identifies input data stored on the external database by retrieving data defined as input data using a plurality of sensor devices. In this embodiment, the program 104 defines input data as raw data received or retrieved from an external device. For example, the program 104 identifies raw SQL data stored on an external server computing device 108.

In step 204, the program 104 analyzes the identified data by assigning a value for a plurality of factors associated with the identified data. In this embodiment, the program 104 analyzes the identified data by comparing the identified data to at least one pre-stored datasets by positively matching the assigned values for the plurality of factors of the identified data to a plurality of pre-stored values for the plurality of factors associated with the pre-stored data sets. In this embodiment, the program 104 defines the pre-stored data sets as data storage containers that are previously stored into the computing device 102. For example, the program 104 analyzes the identified input by comparing the plurality of factors associated with the identified, which is data type and data size as data joins, to a positively matched pre-stored data set. In another embodiment, the pre-stored data sets may be stored on the server computing device 108.

In another embodiment, the program 104 analyzes the identified data outside of the machine learning data pipeline by automatically prioritizing the analyzed data based on the plurality of factors positively matching the pre-stored datasets. In this embodiment and in response to analyzing the identified data by positively matching the plurality of factors associated with the identified input data to the plurality of factors associated with the pre-stored data sets, the program 104 automatically prioritizes the analyzed data based on the percentage of positive matches of the plurality of factors associated with the analyzed data. This step will be further explained in FIG. 3. In this embodiment, the program 104 determines that the identified data can be converted to a uniform domain using relational algebra algorithms by prioritizing the identified data by mapping a data route for efficient conversion, predicting the identified data for subsequent conversions based on the mapped data route, and compacting the predicted data into a single data file. In this embodiment, the program 104 defines the data route as the mapped path from data point to data point within the analyzed data. In this embodiment, the program 104 trains the identified data by storing each mapped data route in the server computing device and predicting future data routes based on the stored data routes from previous mapped data routes. In this embodiment, the program 104 defines prioritizing as placing analyzed data with a higher positive match percentage at a higher position than analyzed data with a lower positive match percentage, which would be placed at a lower percentage.

In this embodiment, the program 104 automatically prioritizes the identified data by standardizing the analyzed data into a uniform domain syntax and mapping the standardized data for specific data points that are defined as data joins or data aggregations. In this embodiment, the program 104 automatically prioritizes the analyzed data by converting the analyzed data into a uniform state capable of modification, prediction, and training and then mapping identified data points within the converted data that are capable of being joined. In this embodiment, the program 104 defines a uniform state as a common denominator carried throughout each data set within the analyzed data, which may be a factor such as data type and data size. In this embodiment, the program 104 maps the analyzed data by identifying the specific data points within the converted data that are capable of being joined, which creates a data join. In this embodiment and in response to mapping the converted data, the program 104 predicts data routes that improve the efficiency of the conversion by feeding a plurality of scenarios into the mapped data route and storing the responses of the converted data each scenario in the plurality of scenarios using a plurality of sensor devices and a machine learning algorithm. In this embodiment, the program 104 predicts the specific data sets that are able to be joined or aggregated based on the plurality of factors associated with the analyzed data. In another embodiment, the program 104 maps the analyzed data by inserting the analyzed data to a first data transformer and a second transformer. In this embodiment, the program 104 defines a data transformer as a database within the computing device 102 that converts the analyzed data from a domain to another domain that allows for efficient data joining and data aggregation. For example, the program 104 identifies five different data sets within the analyzed data based on the plurality of factors of each data set and maps two data joins, where three data sets are consolidated within one data join and the remaining two data sets are consolidated into the remaining data join.

In this embodiment and in response to mapping the analyzed data, the program 104 dynamically predicts the analyzed data by applying a plurality of scenarios to the analyzed data and determining each outcome associated with the application of the plurality of scenarios. In this embodiment, the program 104 defines dynamic training as the determination the outcome from a plurality of outcomes that is the most efficient based on the mapping for data joins and data aggregations within the analyzed data. For example, the program 104 applies a scenario that focuses on detecting an extended projection associated with a specific data set, and the program 104 incremental trains, which is defined as happening over a predetermined period of time, the data to detect minimum and maximum data scaler within the analyzed data.

In this embodiment and in response to predicting the analyzed data, the program 104 reduces the analyzed data by compacting the analyzed data into at least one data set using the plurality of transformers applied to the mapped data joins and data aggregations associated with the analyzed data and a relational algebraic algorithm. In another embodiment, the program 104 dynamically wrangles the analyzed data into a single database within the computing device 102 by consolidating the analyzed data at the mapped data joins and data aggregations using the machine learning algorithm and the relational algebraic algorithm. For example, the program 104 automatically prioritizes analyzed data by mapping the plurality of data types and data sizes associated with the analyzed data, predicting the outcome of the data based on the outcome of a plurality of test scenarios associated with the mapped data types and data sizes associated with the analyzed data and wrangles the analyzed data by consolidating the analyzed data into a single data set at each mapped data type and data size.

In step 206, the program 104 automatically converts the analyzed data. In this embodiment and in response to analyzing the identified data and determining the priority of identified data, the program 104 automatically converts the analyzed data to a uniform domain prior to the analyzed data being inserted into the machine learning data pipeline. In this embodiment, the program 104 converts the analyzed data outside of the machine learning data pipeline by transforming the analyzed data to a uniform domain using a relational algebra algorithm. In this embodiment, the program 104 converts the analyzed data by identifying a plurality of relational factors (i.e., commonalities) between a plurality of datasets, mapping a data route between the identified relational factors, compressing the analyzed data at mapped points of relation within the analyzed data, and converting the compressed data into a domain that allows for application. In this embodiment, the program 104 identifies the relational factors within the analyzed data by wrangling the data for predetermined relational factors. In this embodiment, the program 104 maps the data route by positively matching relational factors between at least two datasets within the analyzed data. In this embodiment, the program 104 compresses the analyzed data by folding the analyzed data at each matching identified relation factor within the mapped data route, where the datasets are joined at those identified relational factors. In this embodiment, the program 104 converts the compressed data using the relational algebra algorithms. In this embodiment, the program 104 defines the uniform domain as a predetermined domain that allows for efficient compaction and expansion throughout the prioritized analyzed data. In this embodiment, the program converts the analyzed data from one syntax domain (i.e., audio domain, image domain, or code) to a different syntax domain.

For example, the program 104 identifies a minimum positive match percentage and a maximum positive match percentage within the analyzed data and determines an extended projection using the relational algebra algorithms by calculating a value associated with the analyzed data subtracted by the identified minimum positive match percentage and dividing the calculated value by the difference between the identified maximum positive match percentage and the identified minimum positive match percentage In this example, the program 104 converts the analyzed data into an extended minimum maximum scaler domain based on the calculated value divided by the difference between the difference between the maximum and minimum. In another example, the program 104 identifies a mean value and a standard deviation associated with the analyzed data and converts the analyzed data into a uniform syntax by subtracting the identified mean from the value associated with the analyzed data and dividing the difference of the identified mean and the value by the identified standard deviation. In this example, the program 104 converts the analyzed data into a standard scaler domain using the relational algebra algorithms. In another example, the program 104 converts the analyzed data to a binarizer domain based on an extend projection associated with the analyzed data. In another example, the program 104 converts the analyzed data to a one hot encoder domain based on a distinct count of categories within the analyzed data. In another example, the program 104 converts the analyzed data to an ordinal encoder domain based on distinct count of categories within the analyzed data and an extended projection associated with the analyzed data.

In step 208, the program 104 inserts the converted data into a data pipeline. In this embodiment and in response to converting the analyzed data, the program 104 dynamically inserts the converted data into a machine learning data pipeline. In this embodiment, the program 104 dynamically modifies the plurality of factors associated with the analyzed data by inserting the prioritized data into the machine learning data pipeline based on the data training and data prediction of the previous step. In this embodiment, the program 104 defines dynamically modifying as the rewriting of the plurality of factors associated with the analyzed data without human interaction. In this embodiment, the program 104 dynamically modifies the prioritized data by transmitting instructions to the machine learning pipeline to rewrite portions of the prioritized data. For example, the program 104 inserts the prioritized data into the machine learning data pipeline and transmits instructions to the machine learning data pipeline to dynamically modify the results of the test data associated with the data training and data prediction of the automatic prioritization of the analyzed data. In another embodiment, the program 104 may convert the prioritized data to uniform data using the relational algebraic algorithm by inserting the prioritized data into the machine learning data pipeline.

In step 210, the program 104 dynamically transmits the converted data from at least one section of the machine learning data pipeline to a subsequent section of the machine learning data pipeline. In this embodiment, the program 104 defines the transmitted data is defined as output of the section the machine learning data pipeline and input of the subsequent section within the machine learning data pipeline. In this embodiment, the program 104 transmits a portion of the converted data as input to the at least one section of the machine learning data pipeline. In this embodiment, the program 104 dynamically selects a data set within the converted data to be transmitted to the machine learning data pipeline. In another embodiment, the program 104 transmits the entire converted data to the machine learning data pipeline.

In another embodiment, the program 104 dynamically selects the data set that is placed at the highest order within the converted data. In this embodiment, the program 104 selects the data set by validating the dynamic prioritization of the converted data and cross validating the converted data by comparing the converted data to the pre-stored datasets stored in the server computing device 108. In this embodiment, the program 104 defines cross-validation as validating at least two factors associated with each data set associated with the prioritized data. In this embodiment, the program 104 cross-validates the converted data by calculating a verification percentage associated with each data set within the converted data, where the verification percentage is defined as a positive match percentage between the prioritized data, the analyzed data, and the pre-stored data. For example, the program 104 selects a data set with a specific feature based on data type that is prioritized to the highest position over a data set with a different feature that was placed a lower position.

Figure 3:
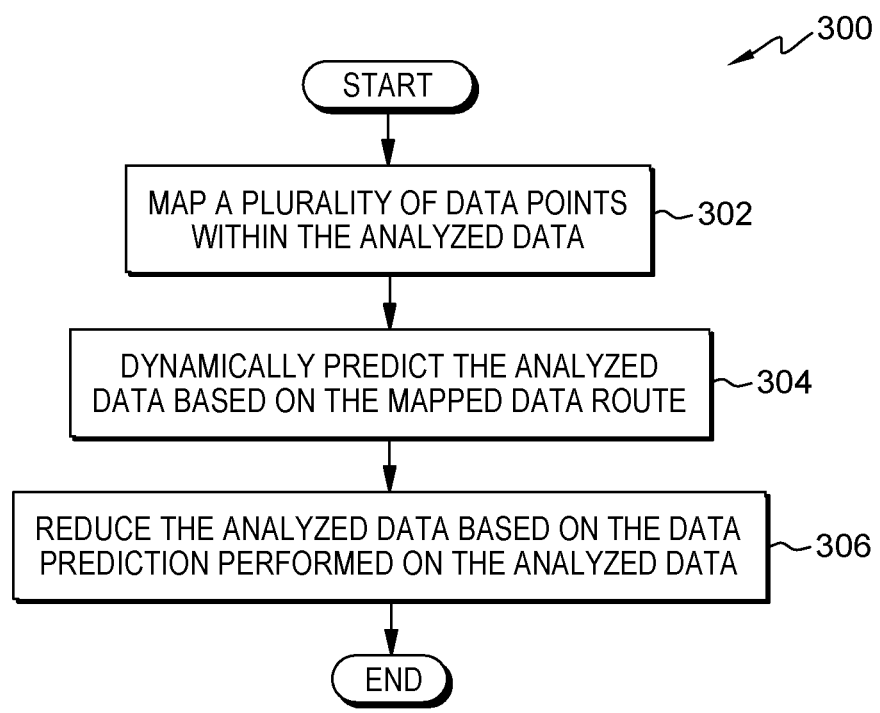
FIG. 3 is a flowchart illustrating operational steps for dynamically prioritizing analyzed data within a machine learning data pipeline, in accordance with at least one embodiment of the present invention.

FIG. 3 is a flowchart 300 illustrating operational steps for dynamically prioritizing analyzed data prior to insertion into the machine learning data pipeline, in accordance with at least one embodiment of the present invention.

In step 302, the program 104 maps a plurality of data points within the analyzed data. In this embodiment, the program 104 maps the analyzed data by scanning for a plurality of data points using a plurality of sensor devices that transmit the results of the scan as a data route. In this embodiment, the program 104 maps a plurality of data points that are defined as data joins and data aggregations associated with specific data sets within the analyzed data. In this embodiment, the program 104 maps the analyzed data by transmitting instructions to the computing device 102 instructing prediction of data routes associated with the analyzed data. In another embodiment, the program 104 maps the analyzed data by transmitting instructions to the computing device instructing training of data sets within the analyzed data based on the prediction of data routes. For example, the program 104 maps five different data points, two main data points, two data delays, and a data event that condense into two data joins forming a data route.

In another embodiment, the program 104 standardizes the analyzed data prior to mapping the analyzed data. In this embodiment, the program 104 standardizes the analyzed data by converting the data into the uniform domain syntax, but the program 104 standardizes the analyzed data prior to the mapping of the data routes associated with the standardized data.

In step 304, the program 104 dynamically predicts the analyzed data based on the mapped data route associated with the analyzed data. In this embodiment and in response to mapping the analyzed data, the program 104 dynamically trains the analyzed data by applying a plurality of scenarios that are associated with the data prediction during the mapping of the data routes. In this embodiment, the program 104 defines the scenarios as a plurality of methods to construct the mapped data route. For example, a scenario focuses on consolidating the analyzed data based on mapped data joins. Another example is a scenario that focuses on consolidating the analyzed data based on mapped data aggregations. Another example is a scenario that focuses on consolidating the analyzed data based on data groups. In this embodiment, the program 104 dynamically predicts the analyzed data by determining the multiple outcomes of the applied scenarios and ranking the determined outcomes based on a positive match percentage associated with each scenario within the plurality of scenarios. In this embodiment, the positive match percentage is defined as a calculated score based on the percentage of matching factors that are shared between the analyzed data and the pre-stored data set.

In step 306, the program 104 reduces the analyzed data based on the data training performed on the analyzed data. In this embodiment and in response to training the analyzed data, the program 104 reduces the analyzed data based on the ranked outcome of the plurality of scenarios associated with the mapped data. In this embodiment, the program 104 reduces the analyzed data by consolidating the analyzed data based on the mapped data route and the highest ranked outcome of a scenario associated with the data training. For example, the program 104 identifies the ranked outcome of the scenario associated with consolidating the mapped data route at mapped data joins, and the program 104 reduces the data scans within the analyzed data into the mapped data joins, which reduces the size of the analyzed data. In another embodiment, the program 104 converts the analyzed data based on the ranked outcome of the plurality of scenarios, which converts the analyzed data into wrangled data.

Figure 4:
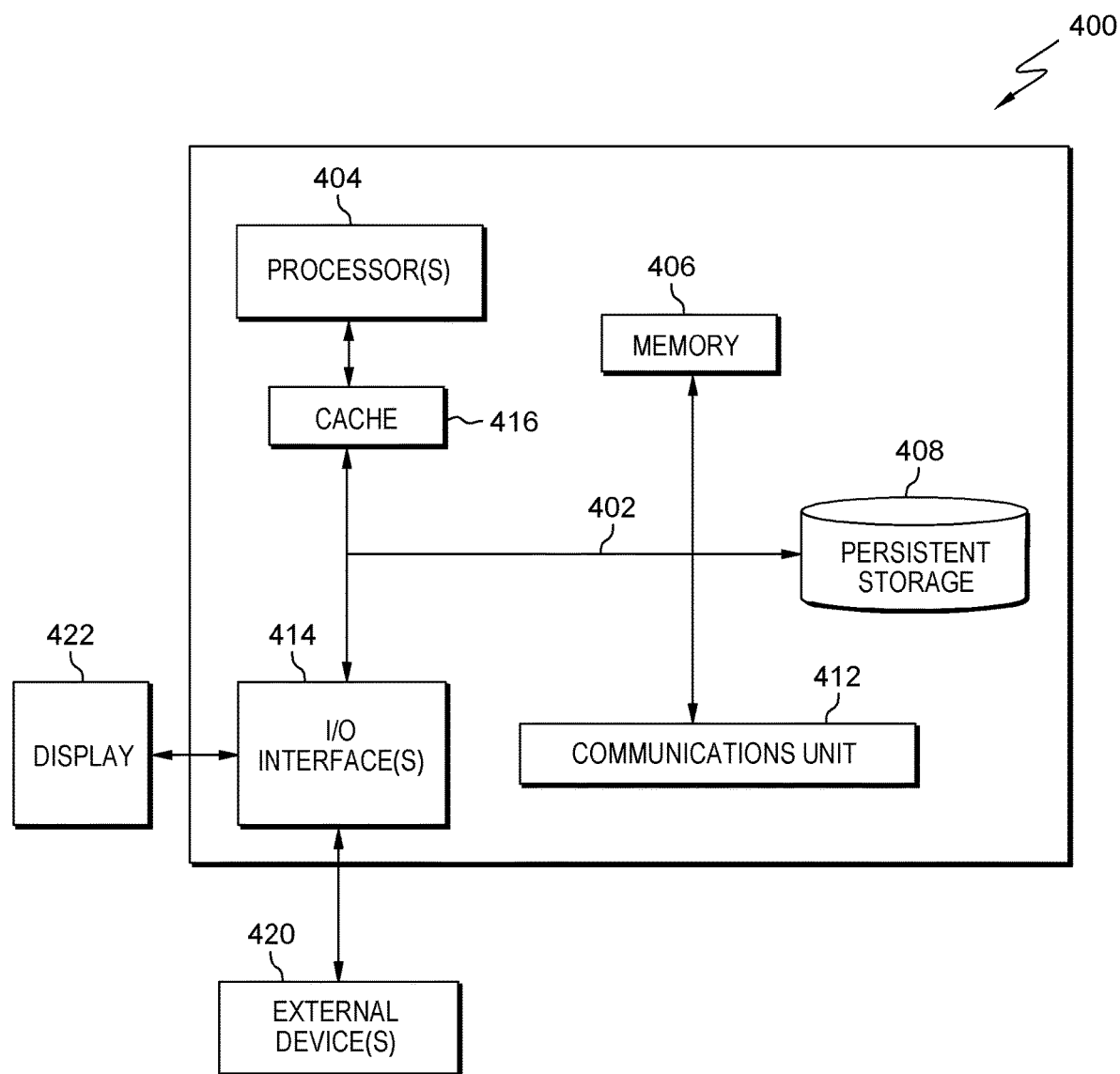
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computing device 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    analyzing identified data for a determined conversion of the identified data, wherein the identified data is input data stored on an external database;
    identifying a plurality of relational factors within the analyzed data, wherein the plurality of relational factors are used to determine data joins of a first dataset and a second dataset of the analyzed data;
    standardizing the analyzed data into a uniform domain using a relational algebra algorithm;
    mapping a data route within the standardized data based on the plurality of relational factors, wherein the data route is predicted based on training data from previously mapped data routes, and wherein the data route comprises a plurality of transformers configured to reduce aggregated data by removing one or more datasets from the standardized data;
    compressing the analyzed data based on the mapped data route, wherein the data joins of the first dataset and the second dataset are joined based on relationship factors within the mapped data route, and wherein the one or more aggregated datasets are removed from the analyzed data to create a compressed dataset;
    converting the compressed dataset into the uniform domain using the relation algebra algorithm; and
    dynamically transmitting the converted, compressed dataset into at least one section of a machine learning data pipeline.

2. The computer-implemented method of claim 1, wherein analyzing the identified data comprises:
    assigning a value for the plurality of relational factors associated with the identified data; and
    positively matching the assigned values for the plurality of relational factors of the identified data to a plurality of pre-stored values for the plurality of relational factors associated with a pre-stored dataset.

3. The computer-implemented method of claim 1, further comprising analyzing the identified data by automatically prioritizing analyzed data based on the plurality of relational factors positively matching the pre-stored datasets.

4. The computer-implemented method of claim 1, wherein mapping the data route further comprises scanning for a plurality of data points using a plurality of sensor devices that transmit the results of the scan as a mapped data route.

5. The computer-implemented method of claim 1, wherein converting the compressed dataset comprises transforming the analyzed data to from at least one syntax domain to a different syntax domain using a relational algebra algorithm.

6. The computer-implemented method of claim 5, wherein a first syntax domain is an image domain and a second syntax domain is a code domain, wherein the first syntax domain is converted to the second syntax domain.

7. The computer-implemented method of claim 1, wherein mapping a data route further comprises:
applying a plurality of scenarios associated with previously mapped data routes;
determining a plurality of outcomes associated with the applied scenarios; and
ranking the determined outcomes based on a positive match percentage associated with each scenario within the plurality of scenarios.

8. The computer-implemented method of claim 1, wherein a data join of the data joins is a relational variable of data that allows for conversion into a single dataset as a dominator between the identified input data and a pre-stored data set, and wherein the data join may be selected from a group consisting of: a type of data, a projection of data, a count of terms within data, and a count of categories within data.

9. The computer-implemented method of claim 1, wherein the uniform domain is a predetermined domain that is configured for efficient compaction and expansion of the analyzed data.

10. The computer-implemented method of claim 1, wherein the uniform domain is selected from a group of domains consisting of:
a binarizer domain based on an extended projection associated with the analyzed data;
a hot encoder domain based on a distinct count of categories within the analyzed data; and
an ordinal encoder domain based on the distinct count of categories and the extended projection associated with the analyzed data.

11. A computer program product comprising:
one or more computer readable storage media and program instructions stored on the one or more computer readable storage media, the program instructions comprising:
program instructions to analyze identified data for a determined conversion of the identified data, wherein the identified data is input data stored on an external database;
program instructions to identify a plurality of relational factors within the analyzed data, wherein the plurality of relational factors are used to determine data joins of a first dataset and a second dataset of the analyzed data;
program instructions to standardize the analyzed data into a uniform domain using a relational algebra algorithm;
program instructions to map a data route within the standardized data based on the plurality of relational factors, wherein the data route is predicted based on training data from previously mapped data routes, and wherein the data route comprises a plurality of transformers configured to reduce aggregated data by removing one or more datasets from the standardized data;
program instructions to compress the analyzed data based on the mapped data route, wherein the data joins of the first dataset and the second dataset are joined based on relationship factors within the mapped data route, and wherein the one or more aggregated datasets are removed from the analyzed data to create a compressed dataset;
program instructions to convert the compressed dataset into the uniform domain using the relation algebra algorithm; and
program instructions to dynamically transmit the converted, compressed dataset into at least one section of a machine learning data pipeline.

12. The computer program product of claim 11, wherein the program instructions to analyze the identified data comprise:
program instructions to assign a value for the plurality of relational factors associated with the identified data; and
program instructions to positively match the assigned values for the plurality of relational factors of the identified data to a plurality of pre-stored values for the plurality of relational factors associated with a pre-stored dataset.

13. The computer program product of claim 11, wherein the program instructions stored on the one or more computer readable storage media further comprise:
program instructions to analyze the identified data by automatically prioritizing analyzed data based on the plurality of relational factors positively matching the pre-stored datasets.

14. The computer program product of claim 11, wherein the program instructions to map the data route further comprise program instructions to scan for a plurality of data points using a plurality of sensor devices that transmit the results of the scan as a mapped data route.

15. A computer system comprising:
one or more computer processors;
one or more computer readable storage media; and
program instructions stored on the one or more computer readable storage media for execution by at least one of the one or more processors, the program instructions comprising:
program instructions to analyze identified data for a determined conversion of the identified data, wherein the identified data is input data stored on an external database;
program instructions to identify a plurality of relational factors within the analyzed data, wherein the plurality of relational factors are used to determine data joins of a first dataset and a second dataset of the analyzed data;
program instructions to standardize the analyzed data into a uniform domain using a relational algebra algorithm;
program instructions to map a data route within the standardized data based on the plurality of relational factors, wherein the data route is predicted based on training data from previously mapped data routes, and wherein the data route comprises a plurality of transformers configured to reduce aggregated data by removing one or more datasets from the standardized data;
program instructions to compress the analyzed data based on the mapped data route, wherein the data joins of the first dataset and the second dataset are joined based on relationship factors within the mapped data route, and wherein the one or more aggregated datasets are removed from the analyzed data to create a compressed dataset;
program instructions to convert the compressed dataset into the uniform domain using the relation algebra algorithm; and
program instructions to dynamically transmit the converted, compressed dataset into at least one section of a machine learning data pipeline.

16. The computer system of claim 15, wherein the program instructions to analyze the identified data comprise:
- program instructions to assign a value for the plurality of relational factors associated with the identified data; and
- program instructions to positively match the assigned values for the plurality of relational factors of the identified data to a plurality of pre-stored values for the plurality of relational factors associated with a pre-stored dataset.

17. The computer system of claim 15, wherein the program instructions stored on the one or more computer readable storage media further comprise:
- program instructions to analyze the identified data by automatically prioritizing analyzed data based on the plurality of relational factors positively matching the pre-stored datasets.

18. The computer system of claim 15, wherein the program instructions to map the data route further comprise program instructions to scan for a plurality of data points using a plurality of sensor devices that transmit the results of the scan as a mapped data route.

\* \* \* \* \*